US012603963B2

(12) United States Patent
Togashi

(10) Patent No.: US 12,603,963 B2
(45) Date of Patent: Apr. 14, 2026

(54) INFORMATION PROCESSING APPARATUS FOR MANAGING POWER-OFF STATES

(71) Applicant: FUJIFILM Business Innovation Corp., Tokyo (JP)

(72) Inventor: Takuya Togashi, Kanagawa (JP)

(73) Assignee: FUJIFILM BUSINESS INNOVATION CORP., Tokyo (JP)

( * ) Notice: Subject to any disclaimer, the term of this patent is extended or adjusted under 35 U.S.C. 154(b) by 370 days.

(21) Appl. No.: 18/184,083

(22) Filed: Mar. 15, 2023

(65) Prior Publication Data

US 2024/0106953 A1 Mar. 28, 2024

(30) Foreign Application Priority Data

Sep. 27, 2022 (JP) ................................ 2022-153287

(51) Int. Cl.
*H04N 1/00* (2006.01)

(52) U.S. Cl.
CPC ..... *H04N 1/00891* (2013.01); *H04N 1/00938* (2013.01)

(58) Field of Classification Search
None
See application file for complete search history.

(56) References Cited

U.S. PATENT DOCUMENTS

2008/0018930 A1* 1/2008 Koike ................ G03G 15/5075 358/1.15
2012/0218597 A1* 8/2012 Hashimoto ........ G03G 15/5004 358/1.15
2013/0007496 A1* 1/2013 Tamura ................ G06F 1/1677 713/323
2014/0347378 A1* 11/2014 Mukai .................. G09G 3/3696 345/531
2016/0212289 A1* 7/2016 Tomi .................. H04N 1/00896
2021/0373819 A1* 12/2021 Shimamura ........... G06F 3/1229

FOREIGN PATENT DOCUMENTS

JP 2008122752 A * 5/2008

* cited by examiner

*Primary Examiner* — Pawan Dhingra
(74) *Attorney, Agent, or Firm* — Oliff PLC

(57) ABSTRACT

An information processing apparatus includes a processor. A first power-off state, which accompanies a reset of hardware and a restart of a program, and a second power-off state, which does not accompany the reset of the hardware and the restart of the program, are defined as states of a power supply of the information processing apparatus. The processor is configured to record, if an operation for turning off the information processing apparatus is performed and the power supply enters the second power-off state, a change in a state of the power supply to the second power-off state, and change the state of the power supply to the second power-off state if a change in the state of the power supply to the second power-off state is recorded after supply of power to the information processing apparatus is stopped and power is again supplied to the information processing apparatus.

9 Claims, 3 Drawing Sheets

10 — IMAGE FORMING APPARATUS

12 PRINTER

14 IMAGE READER

16 FACSIMILE

18 UI
20 DISPLAY DEVICE
22 OPERATION DEVICE

24 POWER BUTTON

26 COMMUNICATION INTERFACE

28 RTC

30 MEMORY 32
RAM
34 NONVOLATILE MEMORY

36 PROCESSOR

INFORMATION PROCESSING APPARATUS FOR MANAGING POWER-OFF STATES

CROSS-REFERENCE TO RELATED APPLICATIONS

This application is based on and claims priority under 35 USC 119 from Japanese Patent Application No. 2022-153287 filed Sep. 27, 2022.

BACKGROUND

(i) Technical Field

The present disclosure relates to an information processing apparatus, a non-transitory computer readable medium, and a method.

(ii) Related Art

Japanese Unexamined Patent Application Publication No. 2008-122752 describes an image forming apparatus that activates and controls blocks to be controlled on the basis of signal levels of signal lines assigned to corresponding blocks.

SUMMARY

A first power-off state, which accompanies a reset of hardware and a restart of programs, and a second power-off state, which does not accompany the reset of the hardware and the restart of the programs, might be defined as states of a power supply of an apparatus. In general, time taken, when a power supply is in the second power-off state, to restore hardware included in an apparatus after an operation for turning on the apparatus is performed is shorter than time taken, when the power supply is in the first power-off state, to restore the hardware after an operation for turning on the apparatus is performed.

If supply of power to an apparatus is stopped and then power is again supplied to the apparatus after a power supply enters the second power-off state, hardware is reset, and the power supply enters the first power-off state. If an operation for turning on the apparatus is performed thereafter, the apparatus is restored from the first power-off state. Time taken to restore the apparatus, therefore, is longer than when the apparatus is restored from the second power-off state.

Aspects of non-limiting embodiments of the present disclosure relate to making it possible to restore an apparatus from the second power-off state even if supply of power to an apparatus is stopped and power is again supplied to the apparatus after a power supply of the apparatus enters the second power-off state, which does not accompany a reset of the hardware and a restart of programs.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor, wherein a first power-off state, which accompanies a reset of hardware and a restart of a program, and a second power-off state, which does not accompany the reset of the hardware and the restart of the program, are defined as states of a power supply of the information processing apparatus, wherein the processor is configured to record, if an operation for turning off the information processing apparatus is performed and the power supply enters the second power-off state, a change in a state of the power supply to the second power-off state, and change the state of the power supply to the second power-off state if a change in the state of the power supply to the second power-off state is recorded after supply of power to the information processing apparatus is stopped and power is again supplied to the information processing apparatus.

BRIEF DESCRIPTION OF THE DRAWINGS

An exemplary embodiment of the present disclosure will be described in detail based on the following figures, wherein.

DETAILED DESCRIPTION

Figure 1:
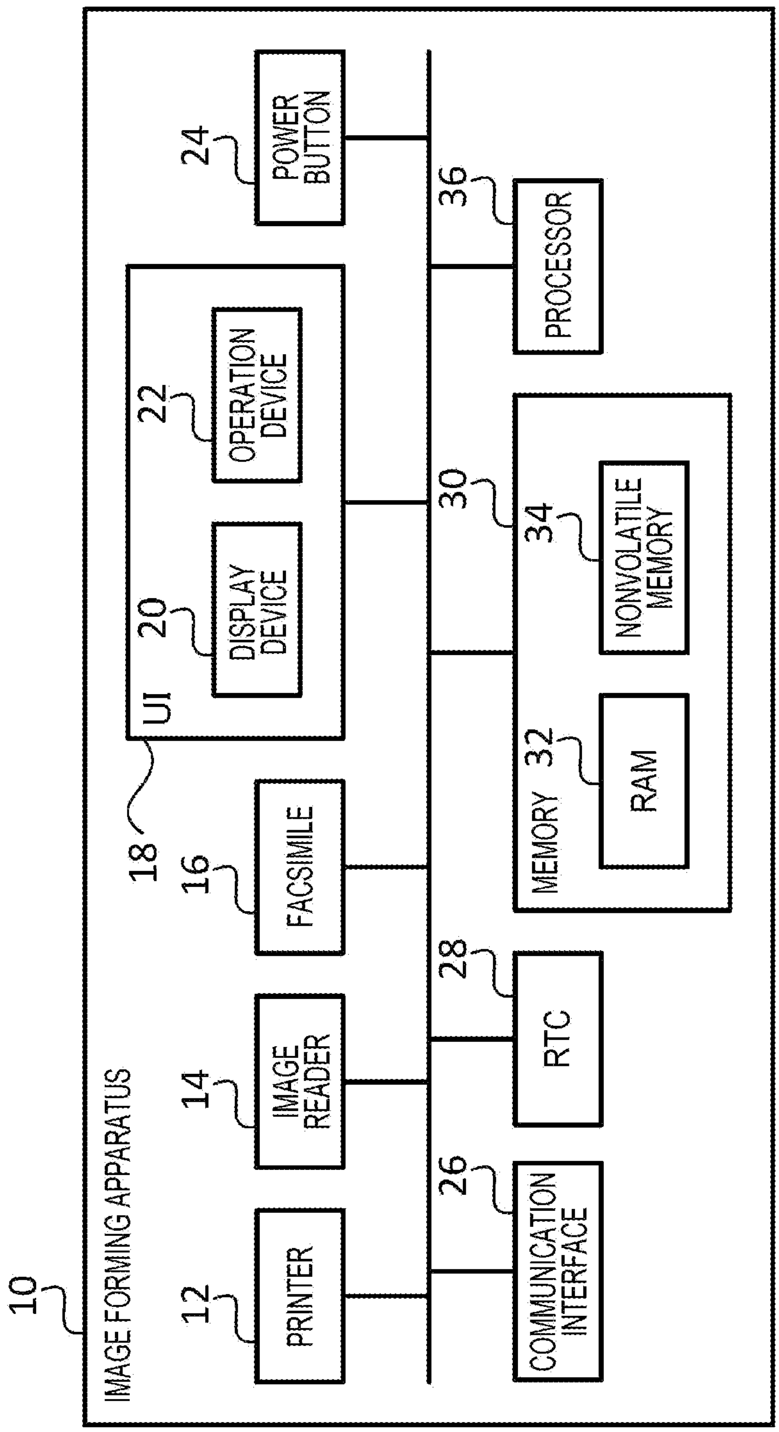
FIG. 1 is a block diagram illustrating the hardware configuration of an image forming apparatus according to an exemplary embodiment.

An information processing apparatus according to an exemplary embodiment will be described hereinafter. The information processing apparatus according to the exemplary embodiment has a function of controlling supply of power thereto, and may be any apparatus having the function.

States of a power supply of the information processing apparatus (i.e., power supply states) will be described. The states of the power supply of the information processing apparatus include, for example, a power-on state, an all-power-off state, a sub-power-off state, and a suspended state. These states of the power supply are examples, and other states of the power supply may be defined, instead.

The power-on state is a state where power is supplied to devices (i.e., hardware) included in the information processing apparatus and the information processing apparatus has been activated and a state where the information processing apparatus can perform processes and operations.

The all-power-off state is a state where power is not supplied to the devices included in the information processing apparatus at all and the devices are not energized at all. A state where the power supply of the information processing apparatus is unplugged, for example, corresponds to the all-power-off state.

The sub-power-off state is a state where the power supply of the information processing apparatus is plugged and a state where the information processing apparatus can be activated by performing an operation for turning on the information processing apparatus (e.g., pressing a power button). A state where power is supplied to only some of the devices included in the information processing apparatus (e.g., a memory and a device for detecting pressing of the power button) and only these devices are energized, for example, corresponds to the sub-power-off state.

In the sub-power-off state, the devices (i.e., hardware) are reset and programs (i.e., software) are restarted. When a user performs an operation for turning off the information processing apparatus (e.g., presses the power button) and the power supply enters the sub-power-off state from the power-on state, for example, the devices are reset and the programs are restarted. The devices may be reset and the programs may be restarted when the user performs an operation for turning on the information processing apparatus (e.g., presses the power button) with the power supply in the sub-power-off state to change the state of the power supply from the sub-power-off state to the power-on state, instead.

That is, the sub-power-off state is a power-off-state accompanying a reset of the devices a restart of the programs. The programs may be restarted when the power supply enters the sub-power-off state from the power-on state or enters the power-on state from the sub-power-off state, instead. The devices may be reset, too, when the power enters the sub-power-off state from the power-on state or enters the power-on state from the sub-power-off state.

In the all-power-off state, too, the devices are reset and the programs are restarted. The all-power-off state, therefore, is a power-off state accompanying the reset of the devices and the restart of the programs. The devices may be reset and the programs may be restarted when the power enters the all-power-off state from the power-on state or enters the power-on state from the all-power-off state, instead. When an operation for turning off the information processing apparatus is performed, for example, the power supply enters the sub-power-off sate from the power-on state. The devices are reset and the programs are restarted at this time. The power supply then enters the all-power-off state when the power supply is unplugged. The devices may be reset and the programs may be restarted after an operation for turning on the information processing apparatus is performed, instead.

When an operation for turning on the information processing apparatus is performed (e.g., the power button is pressed) with the power supply in the sub-power-off state, the power supply is restored to the power-on state from the sub-power-off state, and the information processing apparatus is activated.

The suspended state is a state of the power supply achieved by executing a suspension function of the information processing apparatus. The suspended state is a state where the power supply of the information processing apparatus is plugged and a state where the information processing apparatus can be activated by performing an operation for turning on the information processing apparatus (e.g., pressing the power button). A state where power is supplied to only some of the devices included in the information processing apparatus (e.g., the memory and the device for detecting pressing of the power button) and only these devices are energized, for example, corresponds to the suspended state. Power necessary to hold data is supplied to the memory.

In the suspended state, unlike in the sub-power-off state, the devices are not reset and the programs are not restarted. That is, the suspended state can be regarded as a power-off state that does not accompany the reset of the devices and the restart of the programs.

When an operation for turning off the information processing apparatus is performed (e.g., the power button is pressed) and the power supply enters the suspended state from the power-on state, information indicating states of programs executed before the power supply enters the suspended state (i.e., states of programs executed before an operation for turning off the information processing apparatus) is stored in a memory (e.g., a random-access memory (RAM)).

When an operation for turning on the information processing apparatus is performed (e.g., the power button is pressed) with the power supply in the suspended state, the power supply is restored to the power-on state from the suspended state, and the information processing apparatus is activated. At this time, the programs are not restarted and are restored to the states stored in the memory. As a result, time taken to restore the power supply becomes shorter than when the power supply is restored to the power-on state from the sub-power-off state. In this sense, the suspension function can be regarded as a fast activation function (i.e., a function of activating the information processing apparatus fast) or a fast restoration function.

In the following description, the power-off state accompanying the reset of the devices and the restart of the programs will be referred to as a "first power-off state", and the power-off state that does not accompany the reset of the device and the restart of the programs will be referred to as a "second power-off state". In the case of the above example, the all-power-off state and the sub-power-off state correspond to examples of the first power-off state, and the suspended state corresponds to an example of the second power-off state. The above-described states of the power supply are examples, and a power-off state accompanying the reset of the devices and the restart of the programs is defined as the first power-off state and a power-off state that does not accompany the reset of the devices and the restart of the programs is defined as the second power-off state.

If an operation for turning off the information processing apparatus according to the present exemplary embodiment is performed and the power supply enters the second power-off state, the change in the state of the power supply to the second power-off state is recorded. If a change in the state of the power supply to the second power-off state is recorded at a time when supply of power to the information processing apparatus is stopped and power is again supplied to the information processing apparatus, the power supply enters the second power-off state. A power failure, a momentary power failure, and unplugging of the power supply correspond to examples of a stop of supply of power.

If a change in the state of the power supply to the second power-off state is not recorded at a time when the supply of power to the information processing apparatus is stopped and then power is again supplied to the information processing apparatus, the power supply enters the first power-off state.

An exemplary embodiment will be described hereinafter while taking an image forming apparatus as an example of the information processing apparatus, but an apparatus according to the exemplary embodiment is not limited to the image forming apparatus. The present exemplary embodiment may be applied to an apparatus other than the image forming apparatus, instead.

FIG. 1 illustrates the hardware configuration of an image forming apparatus 10, which is an example of the information processing apparatus. The image forming apparatus 10 includes, for example, a printer 12, an image reader 14, a facsimile 16, a user interface (UI) 18, a power button 24, a communication interface 26, a real-time clock (RTC) 28, a memory 30, and a processor 36.

The printer 12 prints images on a recording medium such as sheets of paper. A printing method is not particularly limited, and may be electrophotography, an inkjet method, or the like. The image reader 14 is a scanner, for example, and reads images from sheets of paper or the like. The printer 12 and the image reader 14 together achieve a copying function. The facsimile 16 transmits and receives information using a facsimile function. Although the image forming apparatus 10 includes the printer 12, the image reader 14, and the facsimile 16 in the example illustrated in FIG. 1, the image forming apparatus 10 may include at least the printer 12, the image reader 14, or the facsimile 16, instead. The image forming apparatus 10 may be a multi-function device including some of the printer 12, the image reader 14, and the facsimile 16, instead.

The UI 18 includes, for example, a display device 20 and an operation device 22. The display device 20 is a liquid crystal display, an electroluminescent (EL) display, or the like. The operation device 22 is a keyboard, a mouse, an input key, an operation panel, or the like. The UI 18 may be a touch panel, instead.

The power button 24 is a button for turning on and off the image forming apparatus 10.

As described above, as the states of the power supply of the image forming apparatus 10, for example, the power-on state, the all-power-off state, the sub-power-off state, and the suspended state are defined.

In the suspended state, power is supplied to only the device for detecting pressing of the power button 24 and the RAM 32. Power necessary to hold data is supplied to the RAM 32. When the power supply enters the suspended state from the power-on state, information indicating states of programs executed before the power supply enters the suspended state (i.e., states of programs before the power button 24 is pressed) is stored in the RAM 32. When the power button 24 is pressed and the pressing is detected with the power supply in the suspended state, the power supply is restored to the power-on state from the suspended state, the image forming apparatus 10 is activated. At this time, the programs are not restarted, and are restored to the states stored in the RAM 32.

If the power button 24 is pressed with the power supply of the image forming apparatus 10 in the power-on state, the power supply of the image forming apparatus 10 enters the first power-off state or the second power-off state from the power-on state. For example, the power supply of the image forming apparatus 10 enters the sub-power-off state or the suspended state from the power-on state.

It is predetermined, for example, that the power supply enters the suspended state when the reset of the hardware and the restart of the programs are not necessary and that the power enters the sub-power-off state when the reset of the hardware and the restart of the programs are necessary. A case where an abnormality that can be eliminated by resetting the hardware and restarting the programs has occurred in the image forming apparatus 10, for example, is an example of a case where the reset of the hardware and the restart of the programs are necessary. The image forming apparatus 10 has a function of detecting an abnormality that has occurred therein. If the power button 24 is pressed after such an abnormality is detected, the power supply enters the sub-power-off state. If the power button 24 is pressed without such an abnormality having been detected, the power supply enters the suspended state. The power supply may enter the sub-power-off state or the suspended state in accordance with conditions other than those described here. The user may set such conditions.

If the power button 24 is pressed with the power supply of the image forming apparatus 10 in the first power-off state or the second power-off state, the power supply of the image forming apparatus 10 enters the power-on state from the first power-off state or the second power-off state. If the power button 24 is pressed with the power supply of the image forming apparatus 10 in the sub-power-off state, the power supply of the image forming apparatus 10 enters the power-on state from the sub-power-off state. If the power button 24 is pressed with the power supply of the image forming apparatus 10 in the suspended state, the power supply of the image forming apparatus 10 enters the power-on state from the suspended state. More specifically, a process for restoring the devices and a process for restoring the programs are performed. In the process for restoring the devices, power is supplied to the devices. When power is supplied to the devices and the devices have been restored, the devices can be used. In the process for restoring the programs, the programs are activated. When the programs have been activated, the programs can be used. In the suspended state, the programs are restored to states stored in the RAM 32.

The communication interface 26 includes a communication chip, a communication circuit, or the like and has a function of transmitting information to other apparatuses and a function of receiving information from other apparatuses. The communication interface 26 may have a wireless communication function such as near-field communication or Wi-Fi (registered trademark) or a wireless communication function.

The RTC 28 generates information such as time, date, month, and year from a clock source and outputs the information.

The memory 30 is a device that serves as one or plural storage areas storing data. The memory 30 includes the RAM 32 and a nonvolatile memory 34. As the nonvolatile memory 34, an electrically erasable programmable read-only memory (EEPROM) or a flash memory, for example, is used. The memory 30 also includes a boot read-only memory (ROM) storing a program for activating the image forming apparatus 10. The memory 30 may also include a hard disk drive (HDD), a solid-state drive (SSD), a memory other than the RAM 32, another storage device (e.g., an optical disc), or the like.

When an operation for turning off the image forming apparatus 10 is performed and the power supply enters the second power-off state, information indicating that the power supply has entered the second power-off state is stored in the nonvolatile memory 34. More specifically, information indicating that the second power-off state is the suspended state and the power supply has entered the suspended state is stored in the nonvolatile memory 34. The information indicating that the power supply has entered the second power-off state (i.e., the suspended state) will be referred to as “suspension information” hereinafter. Storing the suspension information in the nonvolatile memory 34 will also be referred to as setting a suspension flag or raising a suspension flag hereinafter.

The processor 36 controls the operation of the other components of the image forming apparatus 10. For example, the processor 36 controls printing performed by the printer 12, reading of images performed by the image reader 14, transmission and reception of information performed by the facsimile 16, and communication performed by the communication interface 26.

When an operation for turning off the image forming apparatus 10 is performed and the power supply enters the second power-off state, the processor 36 stores, in the nonvolatile memory 34, suspension information indicating that the power supply has entered the second power-off state. If suspension information is stored in the nonvolatile memory 34 when the supply of power to the image forming apparatus 10 is stopped due to a power failure or the like and power is again supplied to the image forming apparatus 10, the processor 36 changes the state of the power supply to the second power-off state. If suspension information is not stored in the nonvolatile memory 34, the processor 36 changes the state of the power supply to the first power-off state.

The printer 12, the image reader 14, the facsimile 16, the UI 18, the power button 24, the communication interface 26, the RTC 28, the memory 30, and the processor 36 each correspond to an example of the device included in the image forming apparatus 10.

Figure 2:
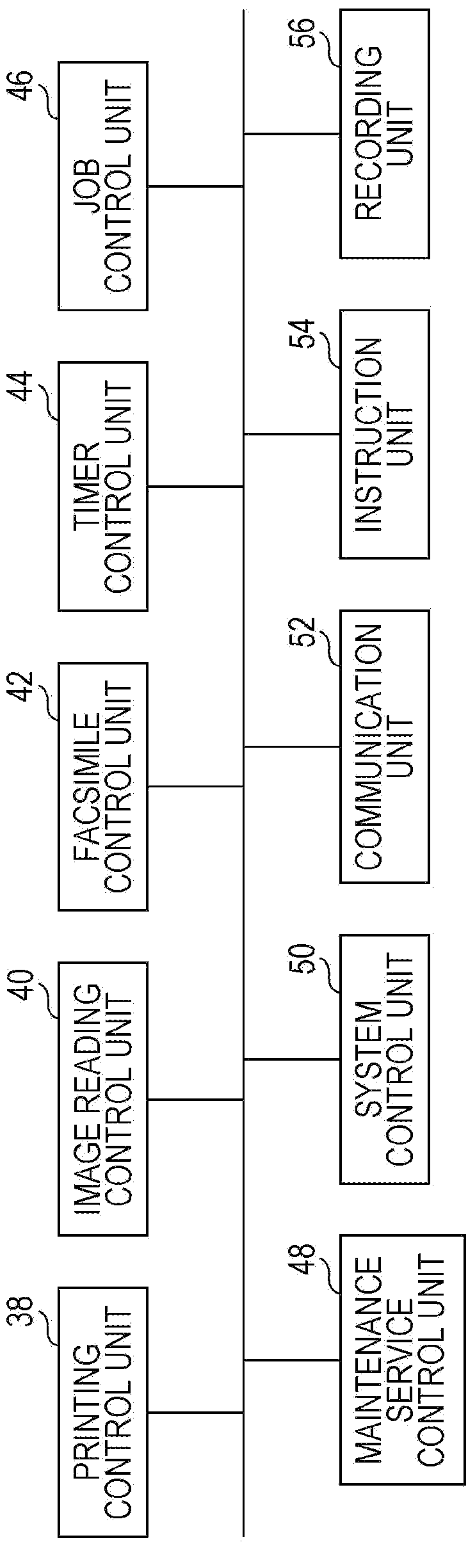
FIG. 2 is a block diagram illustrating functions of the image forming apparatus according to the exemplary embodiment.

FIG. 2 illustrates an example of functions of the image forming apparatus 10.

A printing control unit 38 controls printing performed by the printer 12. An image reading control unit 40 controls reading of images performed by the image reader 14. A facsimile control unit 42 controls transmission and reception of information performed by the facsimile 16. A timer control unit 44 manages time on the basis of outputs of the RTC 28. A job control unit 46 controls execution of a job (e.g., a print job) executed by the image forming apparatus 10. A maintenance service control unit 48 controls execution of a maintenance service and the like for the image forming apparatus 10. A system control unit 50 controls a whole system of the image forming apparatus 10. A communication unit 52 performs communication using the communication interface 26. An instruction unit 54 receives various instructions and outputs the various instructions to relevant components. A recording unit 56 records a change in the state of the power supply to the second power-off state (i.e., the suspended state).

Figure 3:
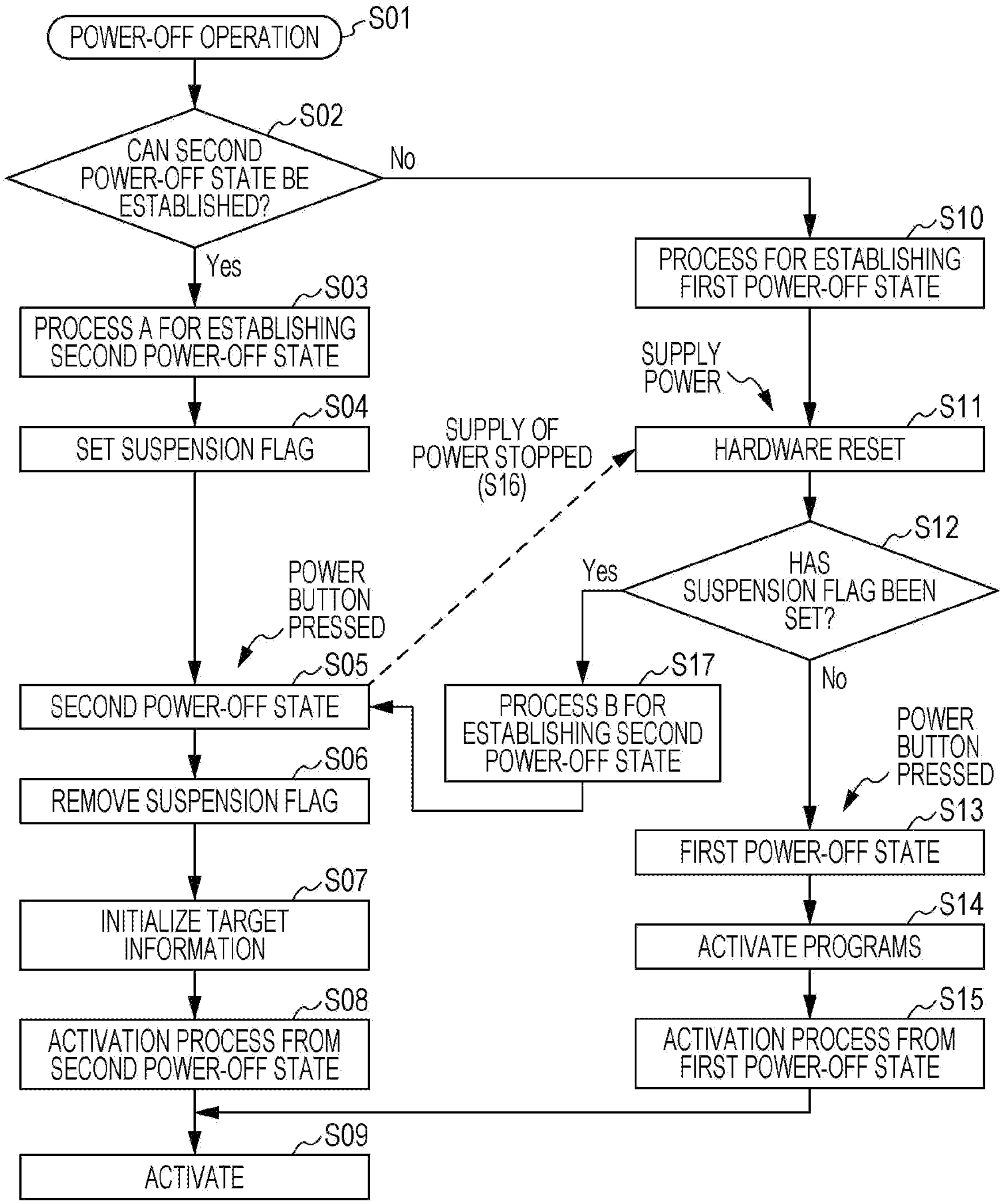
FIG. 3 is a flowchart illustrating how the image forming apparatus according to the exemplary embodiment operates.

How the image forming apparatus 10 operates will be described hereinafter with reference to FIG. 3. FIG. 3 is a flowchart illustrating how the image forming apparatus 10 operates.

When the power supply of the image forming apparatus 10 is in the power-on state, the user performs an operation for turning off the image forming apparatus 10 (S01). More specifically, the user presses the power button 24.

When the user performs the operation for turning off the image forming apparatus 10, the processor 36 determines whether the second power-off state can be established (S02). If no abnormality has occurred in the image forming apparatus 10, for example, the processor 36 determines that the second power-off state (the suspended state, more specifically) can be established. If an abnormality that can be eliminated by resetting the hardware and restarting the programs has occurred in the image forming apparatus 10 and been detected, the processor 36 determines that it is difficult to establish the second power-off state.

If the second power-off state can be established (Yes in S02), the processor 36 performs a process A for establishing the second power-off state (S03). More specifically, the processor 36 changes the state of the power supply to the suspended state from the power-on state.

The processor 36 stores suspension information in the nonvolatile memory 34 (S04). As a result, a suspension flag is set.

In the second power-off state (i.e., the suspended state) (S05), power is supplied to only the device for detecting pressing of the power button 24 and the RAM 32. Power necessary to hold data is supplied to the RAM 32. When the power supply enters the suspended state from the power-off state, information indicating states of programs executed before the power supply enters the suspended state (i.e., states of programs executed before the power button 24 is pressed) is stored in the RAM 32.

If an operation for turning on the image forming apparatus 10 is performed (e.g., the power button 24 is pressed) with the power supply in the second power-off state (S05), the processor 36 removes the suspension flag (S06). That is, the processor 36 removes the suspension information from the nonvolatile memory 34. The processor 36 also initializes target information (S07). The initialization may be performed when the power supply enters the suspended state from the power-on state.

Next, the processor 36 performs a process for activating the image forming apparatus 10 from the second power-off state (S08). As a result, power is supplied to the devices included in the image forming apparatus 10. When power is supplied to the devices and the devices have been restored, the devices can be used. The programs are not restarted and are restored to the states stored in the RAM 32. By performing the activation process, the image forming apparatus 10 is activated (S09). Since the power supply is restored to the power-on state from the second power-off state, time taken to restore the power supply is shorter than when the power supply is restored to the power-on state from the first power-off state.

If it is difficult to establish the second power-on state (No in S02), the processor 36 performs a process for establishing the first power-off state (S10). As a result, the devices (i.e., hardware) are reset (S11), and the information stored in the RAM 32 is removed. Here, the processor 36 changes the state of the power supply to the sub-power-off state from the power-on state.

Next, the processor 36 determines whether a suspension flag is set (S12). That is, the processor 36 determines whether the nonvolatile memory 34 stores suspension information.

Since step S10 has been performed in this process, the nonvolatile memory 34 does not store suspension information (No in S12). In this case, the process proceeds to step S13. As a result of the process for establishing the first power-off state, the power supply enters the first power-off state (e.g., the sub-power-off state) (S13).

If an operation for turning on the image forming apparatus 10 is performed (e.g., the power button 24 is pressed) with the power supply in the first power-off state, the programs are activated (S14). The activation corresponds to the restart of the programs. The programs may be restarted before the power supply enters the first power-off state, instead. For example, the programs may be restarted when the hardware is reset (S11).

The processor 36 performs a process for activating the image forming apparatus 10 from the first power-off state (S15). As a result, power is supplied to the devices included in the image forming apparatus 10. When power is supplied to the devices and the devices have been restored, the devices can be used. By performing the activation process, the image forming apparatus 10 is activated (S09).

If the supply of power to the image forming apparatus 10 is stopped due to a power failure or the like with the power supply in the second power-off state (S16), the process proceeds to step S11. That is, because the devices (i.e., hardware) are reset (S11) and the supply of power to the RAM 32 is also stopped if the supply of power to the image forming apparatus 10 is stopped, the information stored in the RAM 32 is removed. Since the nonvolatile memory 34 stores the suspension information, on the other hand, the suspension information is not removed even if the supply of power to the image forming apparatus 10 is stopped.

When power is supplied to the image forming apparatus 10 thereafter, the processor 36 determines whether a suspension flag is set (S12).

Since steps S04 and S05 have been performed in this process, the nonvolatile memory 34 stores suspension information (Yes in S12). In this case, the process proceeds to step S17.

The processor 36 performs a process B for establishing the second power-off state (the suspended state, more specifically) (S17). The establishing process B is a process for establishing a state of the RAM 32 necessary for the suspended state. More specifically, the processor 36 stores, in the RAM 32, information indicating states at a time when the programs installed on the image forming apparatus 10 have been activated. Power is supplied to only some of the devices included in the image forming apparatus 10 (e.g., the RAM 32 and the device for detecting pressing of the power button 24). Power necessary to hold data is supplied to the RAM 32. After step S17, the process proceeds to step S05.

If an operation for turning on the image forming apparatus 10 is performed with the power supply in the second power-off state, step S06 and later steps are performed. As a result, the image forming apparatus 10 is activated from the second power-off state. Because the information indicating the states at a time when the programs have been activated is stored in the RAM 32 by performing the establishing process B, the programs are not restarted and are restored to the states stored in the RAM 32.

As described above, by storing suspension information in the nonvolatile memory 34 when the power supply enters the second power-off state, the image forming apparatus 10 is restored to the power-on state from the second power-off state even if the supply of power to the image forming apparatus 10 is stopped. As a result, even if the supply of power to the image forming apparatus 10 is stopped, time taken to restore the power supply is shorter than when the power supply is restored to the power-on state from the first power-off state.

If the nonvolatile memory 34 does not store suspension information (No in S12), on the other hand, the image forming apparatus 10 enters the first power-off state and is then restored to the power-on state from the first power-off state.

Modifications will be described hereinafter.

First Modification

In a first modification, if the nonvolatile memory 34 stores suspension information after the supply of power to the image forming apparatus 10 is stopped and power is again supplied to the image forming apparatus 10 in a certain time period, the processor 36 changes the state of the power supply to the second power-off state. The first modification will be described in detail hereinafter. The certain time period is a predetermined time period, and may be changed by the user.

The power supply of the image forming apparatus 10 is in the second power-off state (S05). The nonvolatile memory 34 stores suspension information. The supply of power to the image forming apparatus 10 is stopped (S16), and the process proceeds to step S11. If the nonvolatile memory 34 stores suspension information (Yes in S12) when power is supplied to the image forming apparatus 10 in the certain time period, the processor 36 performs the process B for establishing the second power-off state (S17). If an operation for turning on the image forming apparatus 10 is performed thereafter, the image forming apparatus 10 is restored to the power-on state from the second power-off state (S08 and S09).

If power is supplied to the image forming apparatus 10 in a time period other than the certain time period, on the other hand, the processor 36 changes the state of the power supply to the first power-off state, regardless of whether the nonvolatile memory 34 stores suspension information. In this case, steps S13 to S15 are performed.

The certain time period is, for example, a time period when it is assumed that the user will not use the image forming apparatus 10 (e.g., 22:00 to 4:00 or late at night). That is, if power is supplied late at night, the process B for establishing the second power-off state is performed, and if power is supplied in a time period other than late at night, the power supply enters the first power-off state regardless of whether the nonvolatile memory 34 stores suspension information.

In the image forming apparatus 10, whether the stop of the supply of power to the image forming apparatus 10 (S16) is based on the user's intention is not detected. The supply of power might be stopped, for example, due to a power failure or when the user unplugs the power supply of the image forming apparatus 10. A case where the user intentionally stops the supply of power to the image forming apparatus 10 by unplugging the image forming apparatus 10, for example, will be described. Because the user can activate the image forming apparatus 10 from the second power-off state just by plugging the image forming apparatus 10 in this case, it is assumed that the user might think that the image forming apparatus 10 is suddenly activated. That is, the image forming apparatus 10 operates against the user's expectations. In order to avoid such a situation, the certain time period, when it is assumed the user will not use the image forming apparatus 10, is set, and if power is supplied to the image forming apparatus 10 in the certain time period, the processor 36 changes the state of the power supply to the second power-off state. Since it is assumed that the user will use the image forming apparatus 10 in time periods other than the certain time period, the processor 36 changes the state of the power supply to the first power-off state in the time periods other than the certain time period. As a result, the image forming apparatus 10 will not be activated against the user's expectations in the time periods when it is assumed that the user will use the image forming apparatus 10.

Second Modification

The user may set whether to perform the process according to the present exemplary embodiment. More specifically, the user may set whether to perform steps S04, S12, and S17.

If the user disables the functions of steps S04, S12, and S17, steps S04, S12, and S17 are not performed. As a result, if the supply of power to the image forming apparatus 10 is stopped with the power supply in the second power-off state, the power supply enters not the second power-off state but the first power-off state.

If the user enables the functions of steps S04, S12, and S17, steps S04, S12, and S17 are performed.

When the user sets whether to perform the process according to the present exemplary embodiment, the image forming apparatus 10 will not be activated against the user's expectations.

Third Modification

If the image forming apparatus 10 has not been turned on within a predetermined period of time after the power supply entered the second power-off state and the predetermined period of time has elapsed, the processor 36 may change the state of the power supply to the first power-off state. The user may change the predetermined period of time. The predetermined period of time is, for example, one week, one month, or the like.

If the image forming apparatus 10 has not been turned on within the predetermined period of time, the image forming apparatus 10 has not been used during the period. In this case, the operation of the image forming apparatus 10 can be stabilized by resetting the devices and restarting the programs. When the predetermined period of time has elapsed, therefore, the processor 36 changes the state of the power supply to the first power-off state.

Fourth Modification

If the number of times that the power supply has successively entered the second power-off state is larger than or equal to a threshold, the processor 36 does not store suspension information in the nonvolatile memory 34 even when a condition for establishing the second power-off state is satisfied. As a result, even if power is supplied after the supply of power is stopped, the power supply enters not the second power-off state but the first power-off state. If the number of times is larger than or equal to the threshold, the operation of the image forming apparatus 10 can be stabilized by resetting the devices and restarting the programs. If the number of times is larger than or equal to the threshold, therefore, the processor 36 does not store suspension information in the nonvolatile memory 34. As a result, the power supply enters the first power-off state, which accompanies the reset of the devices and the restart of the programs. The threshold may be set in advance or set by the user.

Application examples of the present exemplary embodiment will be described hereinafter.

First Application Example

A user (e.g., an employee) changed the state of the power supply of the image forming apparatus 10 to the suspended state when leaving work. A power failure occurred late at night, and the supply of power to the image forming apparatus 10 stopped. The electricity then came back on, and power was supplied to the image forming apparatus 10 and the power supply entered the suspended state. The user turned on the image forming apparatus 10 when arriving at work next day, and the image forming apparatus 10 was restored to the power-on state from the suspended state. Fast activation was thus achieved despite the power failure.

Second Application Example

A user newly purchased the image forming apparatus 10. The user plugged the power supply of the image forming apparatus 10 and pressed the power button 24, and the image forming apparatus 10 is activated from the power-off state. In this case, since the power supply was not in the suspended state, the image forming apparatus 10 was not activated from the suspended state. The image forming apparatus 10, therefore, was not activated against the user's expectations.

Third Application Example

A third application example is an example of application of the first modification.

In order to move the image forming apparatus 10 for a change of office layout, a user changed the state of the power supply of the image forming apparatus 10 to the suspended state and unplugged the power supply of the image forming apparatus 10. The user moved the image forming apparatus 10 and then plugged the power supply of the image forming apparatus 10. A time period when the user plugged the power supply of the image forming apparatus 10 was a time period other than the certain time period. The user pressed the power button 24, and the image forming apparatus 10 was activated from the first power-off state. The image forming apparatus 10, therefore, was not activated against the user's expectations.

Each of the functions of the image forming apparatus 10 is achieved, for example, through cooperation between hardware and software. Each of the functions of the image forming apparatus 10 is achieved, for example, when the processor 36 of the image forming apparatus 10 reads a program stored in the memory 30 and executes the program. The program is stored in the memory via a storage medium such as a compact disc (CD) or a digital versatile disc (DVD) or a communication path such as a network.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

Appendix (((1)))

An information processing apparatus comprising:

a processor, wherein a first power-off state, which accompanies a reset of hardware and a restart of a program, and a second power-off state, which does not accompany the reset of the hardware and the restart of the program, are defined as states of a power supply of the information processing apparatus, and wherein the processor is configured to:

record, if an operation for turning off the information processing apparatus is performed and the power supply enters the second power-off state, a change in a state of the power supply to the second power-off state, and change the state of the power supply to the second power-off state if a change in the state of the power supply to the second power-off state is recorded after supply of power to the information processing apparatus is stopped and power is again supplied to the information processing apparatus.

(((2)))

The information processing apparatus according to (((1))), wherein the processor is configured to change the state of the power supply to the first power-off state if a change in the state of the power supply to the second power-off state is not recorded after the supply of power to the information processing apparatus is stopped and power is again supplied to the information processing apparatus.

(((3)))

The information processing apparatus according to (((1))) or (((2))), wherein the processor is configured to change the state of the power supply to the second power-off state if a change in the state of the power supply to the second power-off state is recorded after the supply of power to the information processing apparatus is stopped and power is again supplied to the information processing apparatus in a certain time period.

(((4)))

The information processing apparatus according to (((3))), wherein the processor is configured to change, if the supply of power to the information processing apparatus is stopped and power is again supplied to the information processing apparatus in a time period other than the certain time period, the state of the power supply to the first power-off state regardless of whether a change in the state of the power supply to the second power-off state is recorded.

(((5)))

The information processing apparatus according to any one of (((1))) to (((4))), wherein the processor is configured to change the state of the power supply to the first power-off state if the information processing apparatus has not been turned on within a predetermined period of time after the power supply entered the second power-off state and the predetermined period of time has elapsed.

(((6)))

A program causing a computer that controls an apparatus for which a first power-off state, which accompanies a reset of hardware and a restart of a program, and a second power-off state, which does not accompany the reset of the hardware and the restart of the program, are defined to execute a process comprising:

recording, if an operation for turning off the apparatus is performed and the power supply enters the second power-off state, a change in a state of the power supply to the second power-off state, and changing the state of the power supply to the second power-off state if a change in the state of the power supply to the second power-off state is recorded after supply of power to the apparatus is stopped and power is again supplied to the apparatus.

What is claimed is:

1. An information processing apparatus comprising:

a processor, wherein a first power-off state, which accompanies a reset of hardware and a restart of a program, and a second power-off state, which does not accompany the reset of the hardware and the restart of the program, are defined as states of a power supply of the information processing apparatus, wherein the processor is configured to:

record, if an operation for turning off the information processing apparatus is performed and the power supply enters the second power-off state, a change in a state of the power supply to the second power-off state, and in response to the change in the state of the power supply to the second power-off state having already been recorded at the time of supply of power to the information processing apparatus being completely stopped, change the state of the power supply to the second power-off state upon power being again supplied to the information processing apparatus, and wherein the first power-off state is a state in which transitioning from the first power-off state requires the reset of the hardware and the restart of the program, the second power-off state is a state in which transitioning from the second power-off state does not require the reset of the hardware and the restart of the program, and only some of the hardware of the information processing apparatus receives power in the second power-off state.

2. The information processing apparatus according to claim 1, wherein the processor is configured to change the state of the power supply to the first power-off state if the change in the state of the power supply to the second power-off state is not recorded after the supply of power to the information processing apparatus is stopped and the power is again supplied to the information processing apparatus.

3. The information processing apparatus according to claim 1, wherein the processor is configured to change the state of the power supply to the second power-off state if the change in the state of the power supply to the second power-off state is recorded after the supply of power to the information processing apparatus is stopped and the power is again supplied to the information processing apparatus in a certain time period.

4. The information processing apparatus according to claim 2, wherein the processor is configured to change the state of the power supply to the second power-off state if the change in the state of the power supply to the second power-off state is recorded after the supply of power to the information processing apparatus is stopped and the power is again supplied to the information processing apparatus in a certain time period.

5. The information processing apparatus according to claim 3, wherein the processor is configured to change, if the supply of power to the information processing apparatus is stopped and the power is again supplied to the information processing apparatus in a time period other than the certain time period, the state of the power supply to the first power-off state regardless of whether the change in the state of the power supply to the second power-off state is recorded.

6. The information processing apparatus according to claim 4, wherein the processor is configured to change, if the supply of power to the information processing apparatus is stopped and the power is again supplied to the information processing apparatus in a time period other than the certain time period, the state of the power supply to the first power-off state regardless of whether the change in the state of the power supply to the second power-off state is recorded.

7. The information processing apparatus according to claim 1, wherein the processor is configured to change the state of the power supply to the first power-off state if the information processing apparatus has not been turned on within a predetermined period of time after the power supply entered the second power-off state and the predetermined period of time has elapsed.

8. A non-transitory computer readable medium storing a program causing a computer that controls an apparatus for which a first power-off state, which accompanies a reset of hardware and a restart of a program, and a second power-off state, which does not accompany the reset of the hardware and the restart of the program, are defined as states of a power supply of the apparatus to execute a process comprising:

recording, if an operation for turning off the apparatus is performed and the power supply enters the second power-off state, a change in a state of the power supply to the second power-off state, and in response to the change in the state of the power supply to the second power-off state having already been recorded at the time of supply of power to the apparatus being completely stopped, changing the state of the power supply to the second power-off state upon power being again supplied to the apparatus, wherein the first power-off state is a state in which transitioning from the first power-off state requires the reset of the hardware and the restart of the program, the second power-off state is a state in which transitioning from the second power-off state does not require the reset of the hardware and the restart of the program, and only some of the hardware of the apparatus receives power in the second power-off state.

9. A method used by an apparatus for which a first power-off state, which accompanies a reset of hardware and a restart of a program, and a second power-off state, which does not accompany the reset of the hardware and the restart of the program, are defined as states of a power supply of the apparatus, the method comprising:

recording, if an operation for turning off the apparatus is performed and the power supply enters the second power-off state, a change in a state of the power supply to the second power-off state, and in response to the change in the state of the power supply to the second power-off state having already been recorded at the time of supply of power to the apparatus being completely stopped, changing the state of the power supply to the second power-off state upon power being again supplied to the apparatus, wherein the first power-off state is a state in which transitioning from the first power-off state requires the reset of the hardware and the restart of the program, the second power-off state is a state in which transitioning from the second power-off state does not require the reset of the hardware and the restart of the program, and only some of the hardware of the apparatus receives power in the second power-off state.

* * * * *